United States Patent [19]
Peterson, Jr.

[11] 3,760,673
[45] Sept. 25, 1973

[54] PLASTIC CUTTING MACHINE

[75] Inventor: Russell I. Peterson, Jr., Seekonk, Mass.

[73] Assignee: Cumberland Engineering Company, Inc., Pawtucket, R.I.

[22] Filed: Nov. 19, 1971

[21] Appl. No.: 200,356

[52] U.S. Cl. .................. 83/349, 83/594, 83/674
[51] Int. Cl. .................................. B23d 25/02
[58] Field of Search ............. 83/349, 355, 581, 83/592, 594, 596, 674

[56] References Cited
UNITED STATES PATENTS

| | | | |
|---|---|---|---|
| 3,650,171 | 3/1972 | Reed | 83/349 X |
| 3,244,049 | 4/1966 | Smith et al. | 83/355 |
| 2,399,529 | 4/1946 | Willits | 83/349 X |
| 2,805,715 | 9/1957 | Novick | 83/349 X |
| 3,359,843 | 12/1967 | Mead | 83/349 |
| 3,401,585 | 9/1968 | Schmermund | 83/349 X |

Primary Examiner—Andrew R. Juhasz
Assistant Examiner—Leon Gilden
Attorney—Burnett W. Norton et al.

[57] ABSTRACT

A machine for dicing plastic sheet material, in which a horizontal rotor has teeth on the periphery thereof which are in cutting relationship to the teeth on a stationary bed knife, the latter being tilted at an angle to the axis of the rotor. The construction permits the use of a plurality of straight knives having teeth on the rotor, instead of helical knives, permits the cutting of thin sheet material, and has a relatively low noise level in operation.

9 Claims, 7 Drawing Figures

INVENTOR
RUSSELL I. PETERSON, JR
BY
Townsend M. Gunn
ATTORNEYS

INVENTOR
RUSSELL I. PETERSON, JR.

BY
Townsend M. Gunn
ATTORNEYS

PLASTIC CUTTING MACHINE

BACKGROUND OF THE INVENTION

In the manufacture of molding material, one of the preferred forms of the material for introduction into the molding die, is small cubes or rather thin rectangles. These materials are conventionally prepared by feeding flat sheet material made of a molded thermoplastic resin at an angle into machines called dicing machines, the dicing machine having a plurality of knives mounted on a horizontally mounted rotor, the forward edges of the knives being provided with teeth or serrations. A single stationary bed knife is used which also has teeth or serrations. The rotor knife and bed knife teeth are in cutting conjunction. The number of teeth on each rotor knife is generally one-half the number of teeth on the bed knife, with the result that when the sheet stock is fed into the machine at an angle to the line of cut, a plurality of small cubes or rectangles is cut from the sheet material.

One difficulty with the conventional machine is that it creates a very high amount of noise, because all the teeth of a given rotor knife cut the sheet material simultaneously, and since the rotor speed is fairly high, the noise level created is high.

In order to reduce this, machines have been sold in which such simultaneous engagement does not take place, this being done by using spiral knives on the rotor so that at most only a few of the teeth are cutting at any given position of the rotor.

The diffulty with the spiral knives on the rotor is the cost of the manufacture thereof, and also the fact that relatively few knives can be mounted on the rotor in such machines. This latter being the case, the production rate of the machine may not be as high as desired.

SUMMARY OF THE INVENTION

It is the general purpose of this invention to provide a machine which has a relatively low cutting noise level, and yet which has a relatively high production rate. A machine is provided in which more knives can be economically mounted on the rotor than is the case of machines which use spiral knives. Also, since more knives can be put on the rotor, then for a given output required of the machine, the latter can be operated at a lower speed with resulting less noise.

Therefore, among the several objects and provisions of the invention may be noted the following:

One object of the invention is the provision of a dicing machine for sheet plastics, the machine having a relatively low noise level;

Another object of the invention is the provision of a machine of the above class, in which cutting is done by a plurality of knives mounted on a rotor;

Still another object of the invention is the provision of a machine of either of the above classes, in which only a few of the teeth on a rotary knife are in cutting engagement with the stationary bed knife at any given position of the rotor;

An object of the invention is the provision of a machine of the last named class, in which means are provided for minimizing the tendency of the knives thereof to exert a side thrust on the sheet material being cut;

Other objects and advantages of the invention will be in part obvious and in part pointed out hereinafter.

The invention accordingly comprises the elements and combinations of elements, features of construction, arrangement of parts, and the manipulation of the apparatus, all of which will be exemplified in the structure hereinafter set forth, and the scope of the application of which will be indicated in the appended claims.

In the accompanying drawings, in which are illustrated two embodiments of the invention, the drawings being in simplified form as to non-essential or conventional parts:

Similar reference characters indicate corresponding parts throughout several views of the drawings, and the dimensions of certain of the parts as shown in the drawings may have been modified and/or exaggerated for the purposes of clarity of illustration.

Figure 1:
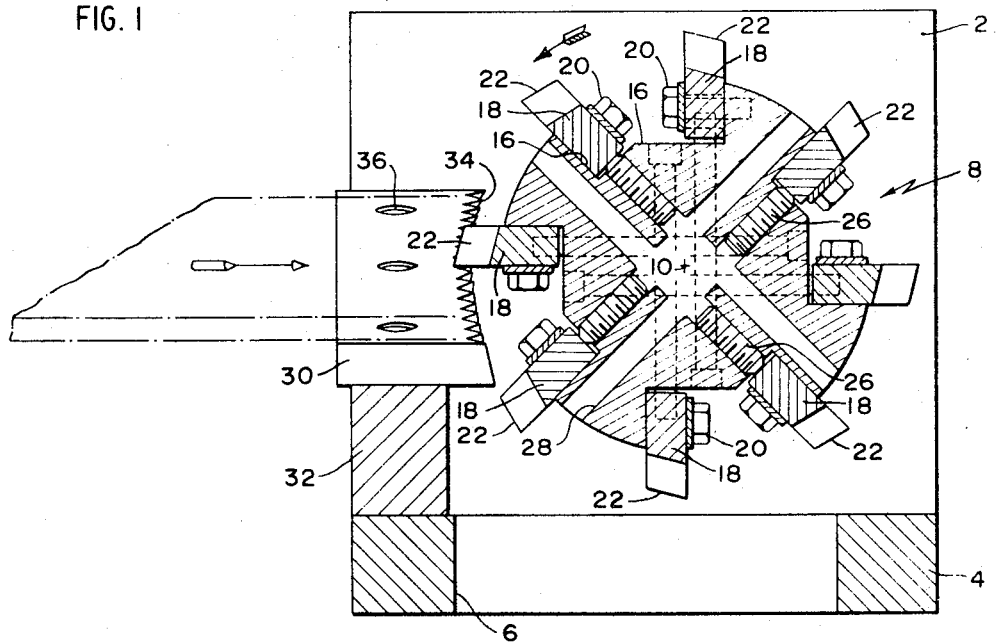
FIG. 1 is an end elevation, partly in section, partly in prospective, showing details of one embodiment of the invention, one end bearing plate or support being removed.

Referring now to FIG. 1, there is shown one embodiment of the invention. A pair of conventional end plates or supports 2 is provided, as well as a bed or base 4 on which plates 2 are fixed. Bed 4 is provided with opening 6. A rotor indicated generally by numeral 8 is provided, the rotor being provided with the shafts 10 in conventional manner, and the latter being held in suitable bearings 12 in the plates 2. In the operation of the apparatus, the rotor is to be turned by a conventional motor which is not shown since it is conventional.

Rotor 8 is provided with slots 16, and against the face of each slot there is mounted a straight rotary or fly knife 18. Each of knives 18 is secured in place by the bolts 20. It will be noted that because the knives are straight, it is possible to mount as many as 16 or more straight knives in a small diameter rotor, for example, one with a diameter about 10 inches. Knives 18 are provided with serrated or toothed cutting edges 22 as shown.

Each of the knives 18 is adjusted by means of the set screws 26 which are provided in suitable threaded holes in the rotor, and reachable by means of the access bores or holes 28. Set screws 26 engage the rear surface of the knives 18 and by screwing them forward, a given knife is moved outwardly in recess 16 until the proper cutting engagement of the teeth 22 is obtained with the teeth of the bed knife of the machine.

As indicated above, because the rotary or fly knives are straight, it is possible to use relatively more of them on the rotor itself than if the knives were spiral. Added advantages are that the straight knives are less costly, and are easier to adjust accurately. They can be removed for sharpening and replaced more readily than can be spiral knives.

A bed knife 30 is mounted on a sub-base 32 which is mounted on or forms part of base 4. This bed knife has serrations or teeth 34 on its forward edge, and is secured to sub-base 32 by bolts 36. When knife 30 is bolted down, then each of knives 18 is adjusted so as to be in proper cutting relation to the knife 30.

Figure 6:
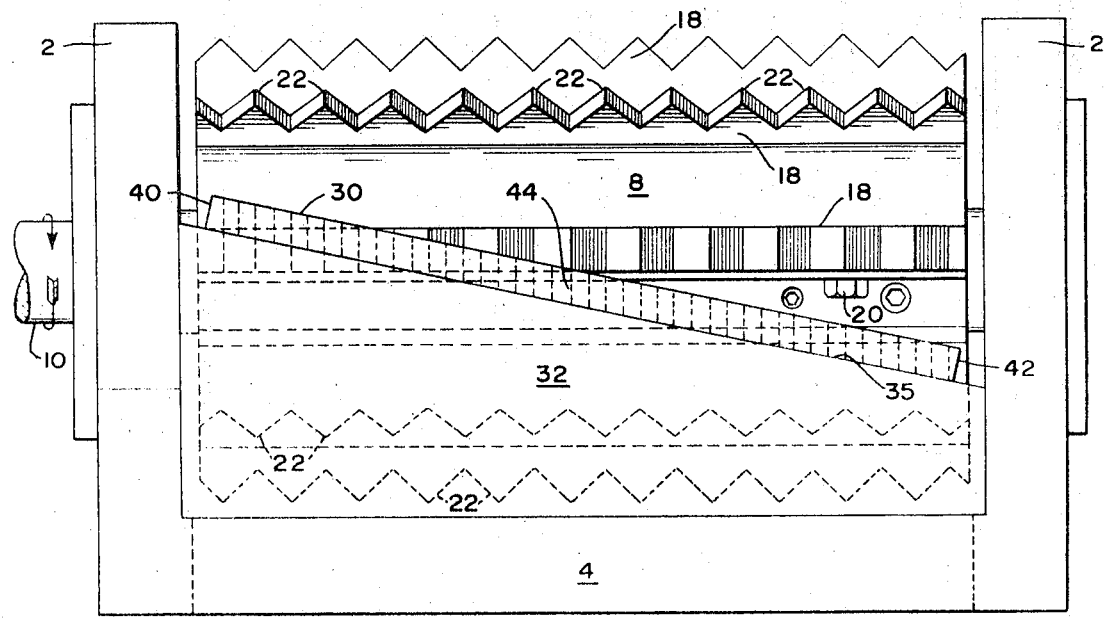
FIG. 6 is a front view of the FIG. 1 embodiment, looking directly into the machine in the direction in which stock is fed.

A reference to FIG. 6 will show that the sub-base 32 has a slanting upper face 35 to which knife 30 is bolted. Face 35 is so located with respect to the axis of rotor 8 that when the knife is mounted, the center 44 of the knife will be approximately radialy centered with respect to the rotor axis.

Figure 2:
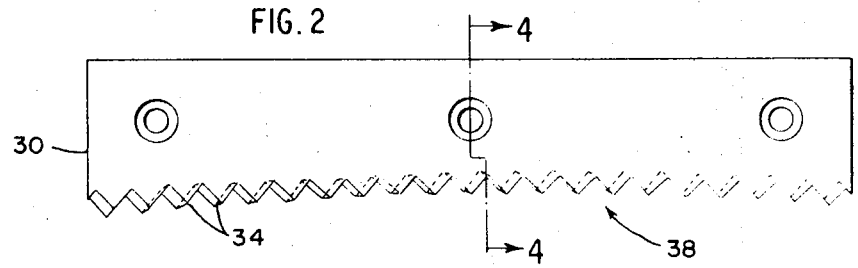
FIG. 2 is a plan view of the bed knife of the FIG. 1 embodiment.
Figures 3, 4:
FIG. 3 is a front elevation of the bed knife of FIG. 2.
FIG. 4 is a sectional end elevation of the bed knife of FIG. 2, taken in the direction of sight lines 4—4 thereon.
Figure 5:
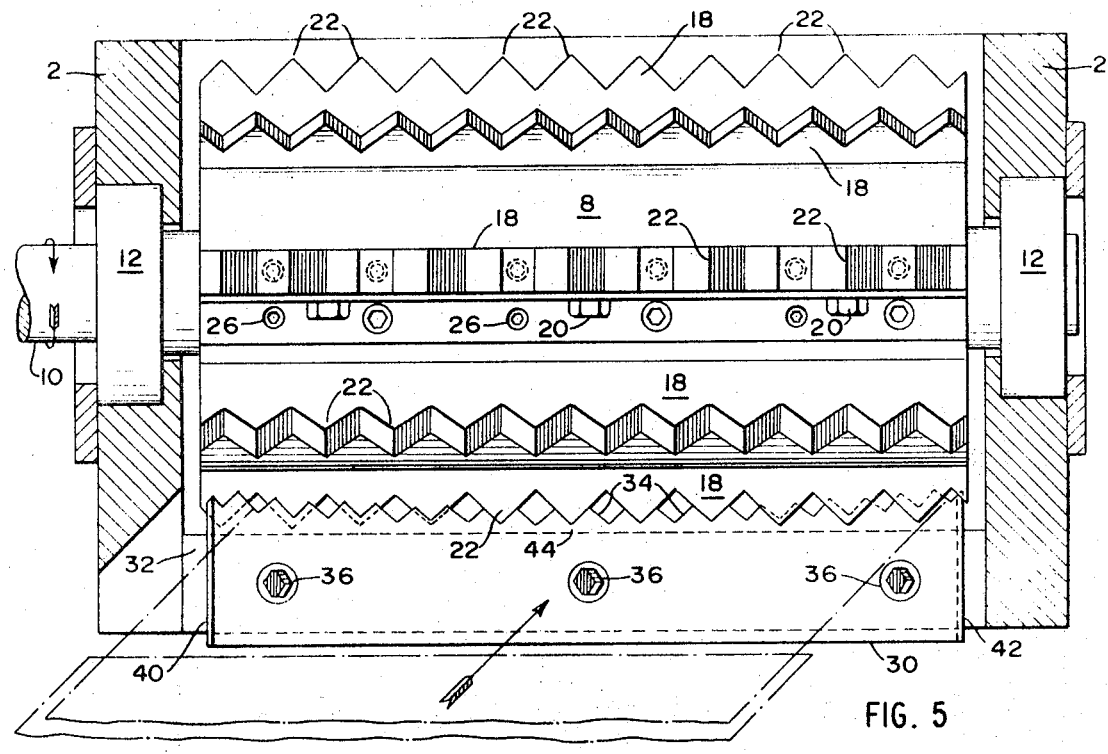
FIG. 5 is a plan view of the FIG. 1 embodiment.

An important feature of the invention will now be described: It will be noted from FIG. 2, that the edge 38 of the knife 30 is in an arc, because since bed knife 30 is inclined at an angle to the axis of the rotor, the knife must project further toward the rotor at the ends of the knife than at the center. Furthermore, because of the slant or screw arrangement of the bed knife, the teeth of each fly knife 22 first come into cutting engagement with the bed knife teeth at the left end 40 of the latter, and are brought into cutting engagement last with the teeth at the right end 42 of the bed knife. Actual tests have shown that with the above construction, wrinkling or crumpling of thin material is either eliminated or greatly minimized. The reason for this is not at this time known to applicant, but it probably is due to both the scissor-like action of the straight fly knives in conjunction with the bed knife, as well as the fact that sheet stock 46, when fed into the machine, lies flat against the bed knife and is therefore at an angle to the flyknives.

In practice, the tilt of the bed knife 30 with respect to the axis of the rotor will vary depending upon the number of the rotor blades. For maximum reduction of noise, no two rotor blades should be in cutting engagement with the bed knife at the same time. By having only one rotary knife complete its cutting action across the entire width of the plastic stock before the next rotary knife engages the stock, the noise level is greatly reduced as compared to what it would be if more than one fly knife were cutting at the same time.

An example of material which has been successfully cut by the above machine, is a vinyl sheet material about one-eigth of an inch thick with a 40 Durometer.

In a machine that has been constructed and found to operate satisfactorily, the rotary knives were approximately 11 inches long and there were 29 teeth on each such knife. Eight knives were provided on the rotor. The rotor itself was aproximately 9 inches in diameter, and was about 11 ¾ inches long. The bed knife had 58 teeth and was approximately 11 ½ inches long. A 10 horse power motor was used to drive the rotor.

In manufacture, the teeth of the bed knife may be formed by electrical discharage grinding or other methods well-known to persons skilled in the art of forming such teeth.

In order to adjust the conjunction of the knives for proper cutting action, first one rotor knife and the bed knife are adjusted. Thereafter, the adjustment of the bed knife is left fixed, and the other rotor knives are adjusted to bring them into the proper conjunction. Of course, in such operation, not only is there a radial adjustment of the knives with respect to each other, but also there must be a lengthwise adjustment of the rotary knives with respect to the bed knife so that the cutting edges actually will not clash.

It will be noted that when the bed knife is skewed at the center thereof, with one end above the axis of the rotor and the other end below the axis of the rotor, then for some reason unknown to the applicant, the resolution of forces engendered by the "scissor" cutting action of the fly knives against the bed knife seems to result in a minimum of side thrust with the result that the machine of this invention can cut relatively thin material. A possible explanation is the fact that if the force of the fly knives is to exert a cutting action in one direction at one side of the center point of the bed knife, then once the knives progress to the other side of the centerpoint, the action is reversed. However, applicant cannot vouch for the accuracy of this explanation. The fact is that with the machine of this invention, relatively very thin material can be cut as compared to present machines on the market.

As indicated above, one important feature of the invention is the fact that by using the straight rotary knives, the cost of the machine is greatly reduced. The spiral knives that are sometimes used on rotors to give the lessened noise reduction, are rather expensive to make, as compared to straight knives. Therefore, the cost of the whole machine can be greatly reduced where it is possible (as in this embodiment) to use straight knives. It will be noted that in conjunction with the straight knives, only one knife is used which in a sense might be called "spiral", but since only one of such knives is used in the machine (the bed knife) the cost of the machine is still relatively much less. Furthermore, since there is only one bed knife, this can be taken out and sharpened and easily put back in place. More than one bed knife does not have to be used.

Figure 7:
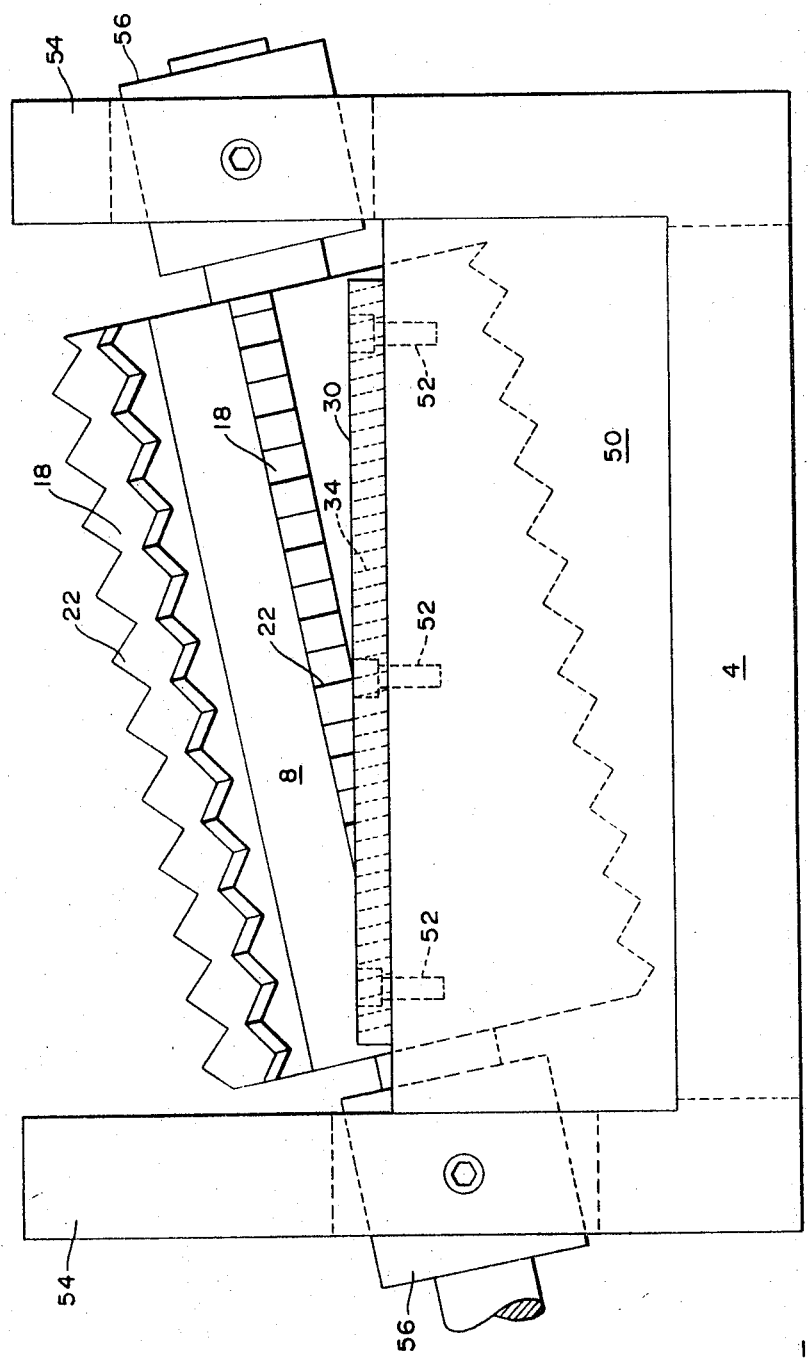
FIG. 7 is a front view of another embodiment of the invention.

Referring now to FIG. 7, a second embodiment of the invention is shown, having bed 4, straight fly knives 22 and bed knife 30 as in the FIG. 1 embodiment. A sub-base 50 is provided on base 4; but in this embodiment, however, the top surface of the sub-base 50 is horizontal. Bed knife 30 is fastened onto base 50 by bolts 52.

Bearing support plates 54 are provided in which are suitably mounted coaxial bearings 56, the axis of the bearings being at an angle to bed knife 30. Journaled in the bearings are the ends of the shaft of the rotor 8.

In this embodiment, the cutting relationship of the fly knives and the bed knife, the adjustment of one with respect to the other, and the advantages over the prior art machines, are the same as in the FIG. 1 embodiment.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. Apparatus for cutting sheet material comprising a bed, bearings mounted on said bed, a rotor supported by said bearings and having an axis of rotation, means for driving said rotor, a plurality of straight rotor knives on the periphery of said rotor, each of said rotor knives having a plurality of teeth thereon with a notch intermediate each adjacent tooth to thereby provide a toothed cutting edge for each of said rotor knives, each said tooth projecting in a plane generally perpendicular to said axis of rotation of said rotor, a stationary knife mounted on said bed and having a plurality of teeth thereon with a notch intermediate each adjacent tooth to thereby provide a toothed cutting edge, each of said teeth on said stationary knife having opposing upper and lower surfaces and a wall extending therebetween, the plane of the cutting edge of said stationary knife being inclined at an angle to said axis of rotation of said rotor, and the walls of said teeth of said stationary knife being inclined at an angle to the plane of the cutting edge of the stationary knife to permit cutting engagement of the teeth of said rotor knives with the teeth of said stationary knife as said rotor is driven to thereby cut pieces of material from said material as the material is fed into said apparatus.

2. Apparatus as set forth in claim 1 wherein the number of teeth on said stationary knife varies from the number of teeth on each said rotor knife.

3. Apparatus as set forth in claim 1 wherein said axis is horizontal and a portion of the plane of the cutting teeth of the stationary knife intersects the horizontal plane containing the said axis, said horizontal plane approximately bisecting the length of the stationary knife.

4. Apparatus as set forth in claim 3 wherein said stationary knife is tilted about a point so that a portion lies above said horizontal plane and a portion lies below said horizontal plane, the point of tilting being approximately at the center of the stationary knife.

5. Apparatus as set forth in claim 4 wherein said point of tilting is radial to the axis of the rotor and lies in said horizontal plane.

6. Apparatus as set forth in claim 1 wherein said stationary knife is wider at its ends than at the center.

7. Apparatus as set forth in claim 1 wherein the teeth of said stationary knife lie in an arc having its ends closer to said axis than its center.

8. Apparatus as set forth in claim 1 wherein said stationary knife is horizontal and said axis is inclined at an angle to the plane of the cutting edges of said stationary knife.

9. Apparatus as set forth in claim 8 wherein the cutting teeth of said stationary knife lie in an arc having its ends closer to said axis than its center.

* * * * *